United States Patent Office.

MANUFACTURE OF PARAFFINE CANDLES.

HENRY RYDER, OF NEW BEDFORD, MASSACHUSETTS.

Letters Patent No. 59,749, dated November 20, 1866.

SPECIFICATION.

TO ALL PERSONS TO WHOM THESE PRESENTS SHALL COME:

Be it known that I, HENRY RYDER, of New Bedford, in the county of Bristol, and State of Massachusetts, have made a new and useful invention having reference to the manufacturing of paraffine candles; and I do hereby declare the same to be fully described in the following specification:

This invention may be said to be an improvement on the invention which constitutes the subject of the patent, No. 22,921, dated February 8, 1859; such patent having been granted to Horatio Leonard and myself and since been wholly vested in me.

The process covered by such patent consisted in the employment of a heated mould, and water and air baths at specified temperatures; such being in manner and for the purpose as described in the specification of such patent.

I have discovered that the air bath used in effecting the gradual cooling or annealing of the paraffine or paraffine candle, after the application of the surface chilling bath to the mould, may be dispensed with, and the process of annealing be carried on much more expeditiously and to better advantage by allowing a small stream of cool or iced water to flow into the chilling bath and a like quantity of its water to escape from it.

The small influx of water into the mould chilling bath and consequent efflux therefrom of water of diminished temperatures, will gradually cool and set the inner portions of the candles without injuriously effecting their surfaces.

A workman soon is enabled to discover, by a little practice, the proper amount of water to be let into the mould bath. This he can do by inserting his finger in the effluent current, the temperature of which will enable him to judge of that of the water of the bath. The saving in labor and time by the improved process of cooling the candles, over that which involves the employment of an air bath, is at least twenty-five per cent; a matter of much importance to the manufacturer.

I would remark, that the water of the surface chilling bath while in action on the mould should be kept at about freezing temperature, that is, about thirty-two degrees Fahrenheit.

After the proper chilling of the surfaces of the paraffine may have been effected, the annealing part of the process, or the gradual reduction of the temperature of the unchilled portions of the paraffine or candles, is to be carried on, and for this purpose a small stream of water, at about freezing temperature, is to be allowed to flow into the bath, a like amount of water, at higher temperature, being allowed to escape from the bath.

I do not herein claim the patented process of cooling the paraffine in the moulds, such involving the use of a water chilling bath and the subsequent employment of an air bath, as set forth in the patent herein before mentioned.

With my improvement I am not only able to dispense with the air annealing bath, but the transportation of the candle moulds from the water chilling bath to such air bath.

What, therefore, I claim as my invention, is—

My improved process, as described, for effecting the annealing or gradual cooling of paraffine in a mould, such consisting in the subjection of the mould containing the melted paraffine, to a chilling bath of water, of about freezing temperature, and subsequently allowing water, of about such temperature, to flow into, and warmer water to flow out of the chilling bath as explained.

HENRY RYDER.

Witnesses:
R. H. EDDY,
SAMUEL N. PIPER.